United States Patent

Trammell

[15] 3,651,382

[45] Mar. 21, 1972

[54] ERASE MECHANISM FOR A TWO-SPINDLE TAPE CASSETTE

[72] Inventor: James R. Trammell, Parma Heights, Ohio

[73] Assignee: Scanfax Systems Corporation, New York, N.Y.

[22] Filed: Oct. 22, 1969

[21] Appl. No.: 868,304

[52] U.S. Cl. ....................................317/157.5, 179/100.2 D
[51] Int. Cl. ....................................................H01f 13/00
[58] Field of Search ........................179/100.2 D; 317/157.51

[56] References Cited

UNITED STATES PATENTS

| | | | |
|---|---|---|---|
| 2,826,642 | 3/1958 | Lyon et al. | 317/157.51 |
| 2,848,660 | 8/1958 | Boyers | 317/157.51 |
| 3,329,872 | 7/1967 | Amos | 179/100.2 D |

*Primary Examiner*—Stanley M. Urynowicz, Jr.
*Assistant Examiner*—Robert S. Tupper
*Attorney*—Amster & Rothstein

[57] ABSTRACT

An erase system for degaussing a magnetic tape in a cassette including a receptacle-forming housing defining a receptacle for insertion of the cassette in one orientation and preventing insertion in another orientation. The system also includes a degaussing means mounted for providing a quick and simple degaussing operation whereby the magnetic tape is twice exposed to the field produced by the degaussing means. A mechanism is provided to insure a quick return of the cassette to the operator with the degaussing means being energized by a switch operable by the action of the return mechanism.

1 Claim, 8 Drawing Figures

INVENTOR.
James R. Trammell
BY
Amster & Rothstein
AMSTER & ROTHSTEIN
ATTORNEYS

INVENTOR.
James R. Trammell
BY
Amster & Rothstein
AMSTER & ROTHSTEIN
ATTORNEYS

ERASE MECHANISM FOR A TWO-SPINDLE TAPE CASSETTE

This invention relates generally to magnetic tape recording and more particularly to an erase system for use in degaussing a magnetic tape.

In systems presently used in the magnetic tape industry, degaussing of the magnetic tape is usually provided by a system including degaussing means located adjacent to the recording head so that a tape erase function is performed by winding or rewinding the tape past the degaussing means. In systems where threading of the tape is not automatic, such presently used erase mechanisms require rethreading of the tape if a recorded tape to be erased had already been removed from the system. Furthermore, in such systems there is the present danger that another tape is in the same vicinity and may be affected by the degaussing means.

Accordingly, a primary object is to provide a magnetic tape erase system for performing degaussing of a magnetic tape in a quick yet reliable and efficient manner.

A still further object is to provide a tape erase system wherein it is assured that the entire tape will pass through the degaussing field for complete erasure.

These and other objects are accomplished in accordance with one illustrative embodiment of the present invention by a magnetic tape erase system for a coiled length of magnetic tape within a two-spindle cassette including a receptacle-forming means including a housing defining a slot and receptacle for the cassette, guide means along one side of the receptacle to accept, upon application of an insertion force, insertion of said cassette into the slot in one orientation and to prevent insertion in another orientation. A degaussing coil is mounted adjacent to the receptacle for creating an electromagnetic field, the degaussing coil being positioned along the receptacle adjacent to the end having the slot to insure a double pass of the tape through the field. The coil produces a 60 Hertz alternating electromagnetic field, the rapid alternation of field polarity accomplishing the erasure of magnetic tape. Switch means and a source of electrical current are provided for the degaussing coil, the switch means being mounted for actuation by motion of the inserted cassette to energize the degaussing coil only when a cassette is in position for a tape to be erased by the electromagnetic field from the degaussing coil. The coil is shut off by return motion of the cassette and the same switch means.

A mechanism is provided to insure a quick return of the cassette to the operator, the mechanism including a guideway, a spring, tape support means in the form of a disc, and connecting means for connecting the spring at one of its ends to the tape support means, the spring being connected at its other end to the receptacle-forming housing adjacent the slot. The connecting means has its motion confined by the guideway to thereby determine a vertical path for the tape support means. The tape support means is adapted to move in the receptacle immediately below the cassette and to expel the cassette by means of the spring action upon release of the insertion force.

The above brief description as well as further objects, features and advantages of the present invention will be more fully appreciated by reference to the following detailed description of the preferred, but nonetheless illustrative embodiment when taken in conjunction with the accompanying drawings, wherein.

Figure 1:
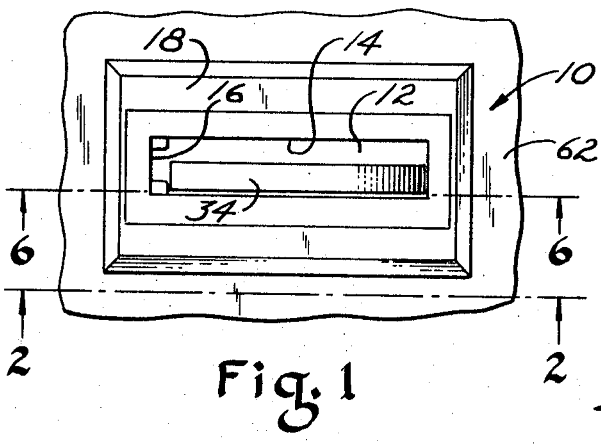
FIG. 1 is a top view of the tape erase system illustrating the slot, the receptacle and the tape support means therein.
Figure 4:
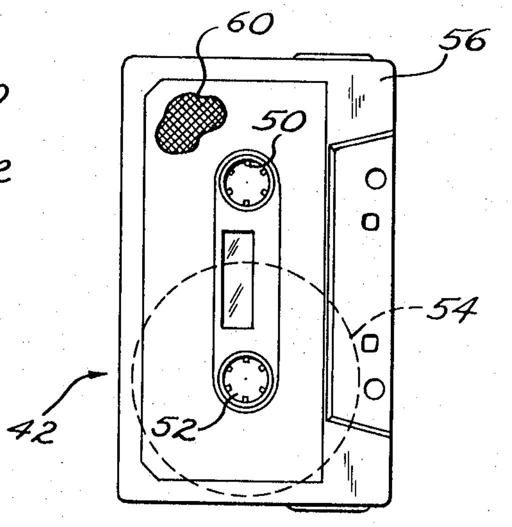
FIG. 4 is a front view of the tape cassette usable in a tape erase system according to the present invention.
Figure 5:
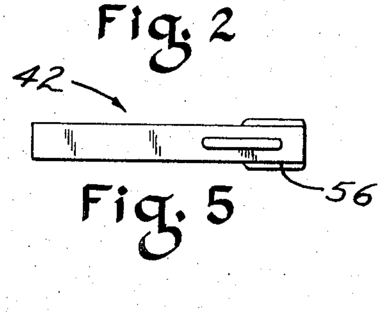
FIG. 5 is a top view of the tape cassette of FIG. 4.

Referring particularly to the drawings, a tape erase system is shown as including three main parts: A receptacle-forming means or housing 10, a tape cassette return means 33 and degaussing means 44. Describing first the receptacle-forming means 10, it includes a generally rectangular housing with top wall 18, front wall 20, side walls 26 and 28 and back wall 22, all depending from the top wall 18. A slot 14 is formed in the top wall 18 sized to receive a standard cassette of the type shown in FIGS. 4 and 5. The receptacle 12 has a guide means 16 formed along one side thereof and a side wall surface 30 on the opposite side. Incorporation of the housing 10 in an overall system design can involve the insertion of the housing 10 to an opening in a horizontal mounting deck 62 and attachment thereto by suitable fasteners 64 or the like. A desirable aesthetic quality may be given to the tape erase system by the exposure of the top wall 18 of the housing 10 and the non-exposure of the balance of the mechanism and structure for the system.

The tape cassette return means 33 is disposed within and adjacent to the receptacle 12. The mechanism 33 includes a guideway 40 formed in the front wall 20, a spring 36, a tape support means in the form of disc 34 and connecting means 38 in the form of a pin 38*a* and collar 38*b* for connecting the support means 34 to the spring 36 and for guiding the support means 34 for movement along the guideway 40. The spring 36 is connected at its other end to the receptacle-forming housing 10 adjacent to the slot 14. The disc 34 is shaped in the form of a circular disc which, in cooperation with the spring 36, provides support for a cassette 42 when inserted to the receptacle 12. The disc 34 is guided in the receptacle 12 at the two points 68 along the guide means 16 and the surface 30.

Figures 2, 3:
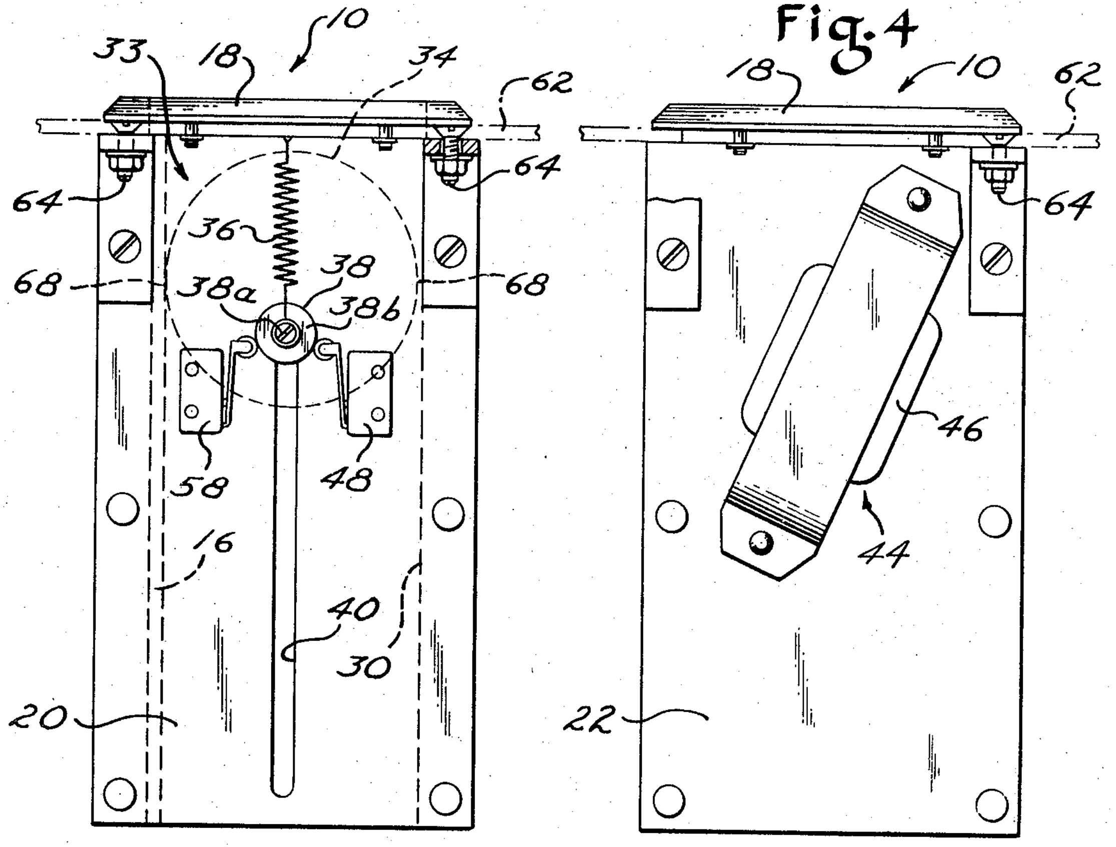
FIG. 2 is a front sectional view of the tape erase system taken along the line 2—2 of FIG. 1 in the direction of the arrows.
FIG. 3 is a back view of the tape erase system illustrating particularly the degaussing coil.

The degaussing means 44 is shown, particularly in FIG. 3, as including a degaussing coil 46. The degaussing means in energized through a microswitch 48 or the like disposed adjacent to the guideway 40 and is triggered by engagement with the collar 38*b* of the connecting means 38 when a cassette is inserted to the receptacle 12, and turned off by the return motion of the cassette.

The receptacle-forming housing 10, the tape cassette return means 33 and the degaussing means 44 are useful with a tape cassette, generally designated 42, which includes a pair of tape spindles 50, 52 with a tape 54 wound on one of the spindles 52. The tape cassette 42 also includes a guide extension 56 (and enlargement) arranged to be non-conforming to the guide means 16 of the receptacle 12 such that the cassette 42 can be inserted only with the guide extension 56 against surface 30 of the receptacle.

Figure 6:
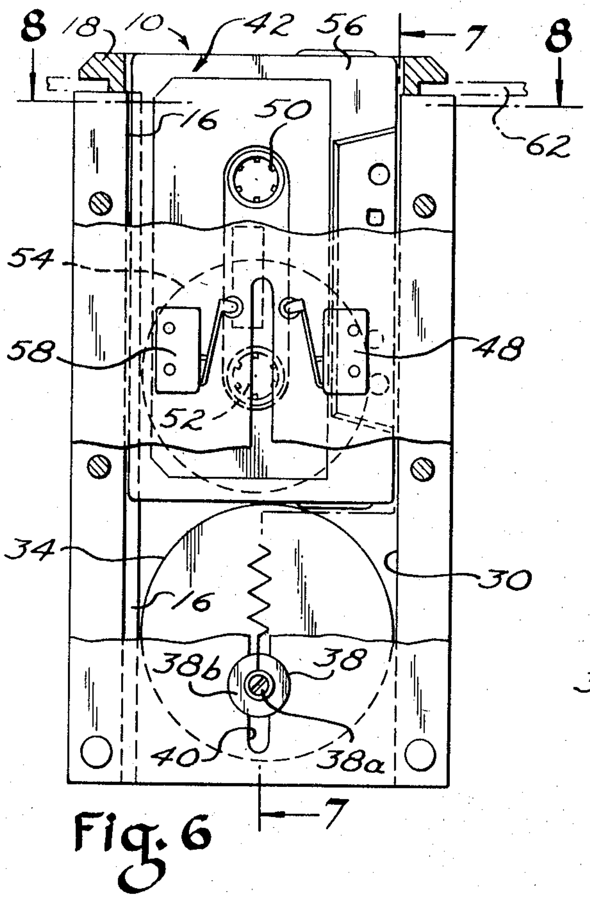
FIG. 6 is a front sectional view taken along the line 6—6 of FIG. 1 showing a tape cassette with its tape in the process of being degaussed.
Figure 7:
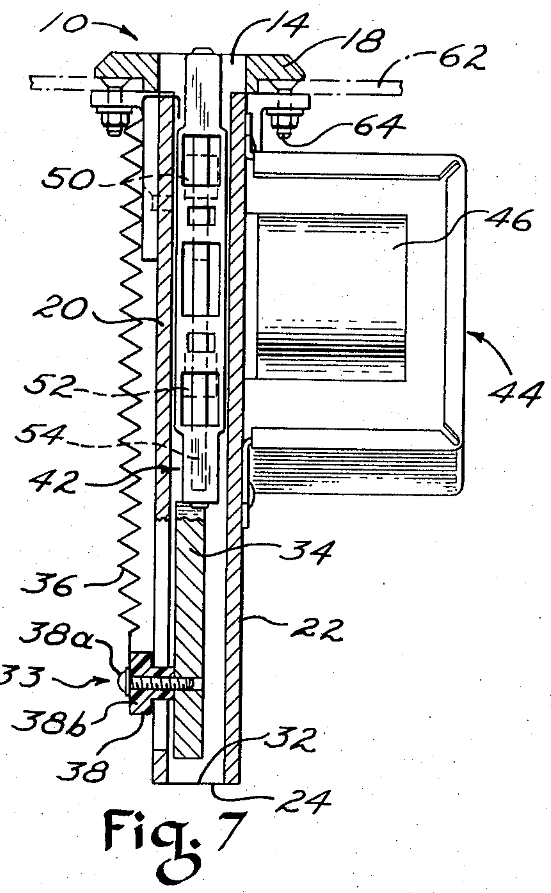
FIG. 7 is a side sectional view of the tape erase system taken along the line 7—7 of FIG. 6 illustrating particularly the tape cassette expulsion mechanism.
Figure 8:
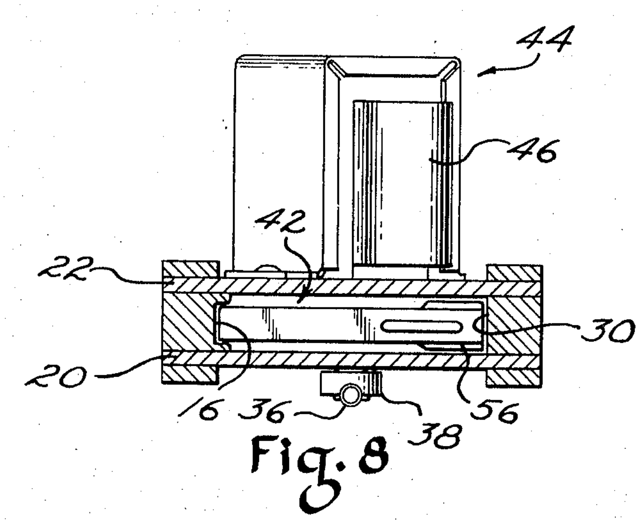
FIG. 8 is a top sectional view of a tape erase system according to the present invention taken along the line 8—8 of FIG. 6 in the direction of the arrows.

In order to provide a better understanding of the present invention, a typical series of operations will now be described. Assuming it is desired to erase a magnetic tape 54 completely wound on one spindle 52 of a two-spindle cassette, the cassette 42 is placed through the slot 14 in an orientation so that the tape coiled spindle is downward and the guide extension 56 is adjacent to inner wall 30 of the receptacle 12. The cassette 42 is inserted to the receptacle 12 through slot 14 to force the tape support disc 34 downwardly. As the tape support disc 34 travels downwardly in the receptacle 12, the spring 36 expands and the connecting means 38 confines the motion of the support disc 34, to which it is connected, so that the motion is in a straight vertical path. As the tape cassette proceeds downwardly, the collar 38*b* of connecting means 38 trips a microswitch 48 thereby actuating the degaussing means 44 so that the degaussing coil 46 produces a directed electromagnetic field for degaussing the tape 54. Since the tape is oriented in the cassette so that it is coiled about the lower spindle 52, the operator need only assure himself that the top of the cassette is forced inwardly to a vertical position corresponding to the vertical position of the top 18 of the receptacle-forming housing 10. In this way all of the tape passes twice through at least a part of the degaussing electromagnetic field, once on its downward path and once on its return path. At the end of its travel downwardly, the cassette 42 is in a position with respect to the other components of the system as shown in FIGS. 6 through 8. When the operator releases the insertion force, the loaded spring 36 provides an upward thrust to the tape support disc 34 to thereby expel the tape cassette 42 from the receptacle 12 and provide it with its second pass through the degaussing field.

In order to further insure the correct orientation of the cassette upon insertion to the receptacle 12, a colored surface 60 (FIG. 4) may be used on one side wall of the cassette 42 thereby indicating to the operator at a quick glance which spindle, 50 or 52, has the magnetic tape 54 coiled about it.

Further details of the preferred erase system include the provision of microswitch 58 for actuation by the connecting means 38 to operate a "tape erase" indicator light (not shown) or the like, which, because of its position parallel to microswitch 48, will energize the light at the same time as the actuation of the microswitch 48 energizes the degaussing means. It is also contemplated, of course, that a source of power for the degaussing means 44 is provided although it is not shown in the drawings.

In accordance with the above description, a magnetic tape erase system is provided at a position removed from the recording mechanism and with provisions being made for insuring the erasure of the entire magnetic tape in a short period of time in an efficient manner.

What is claimed is:

1. An erase system for a coiled length of magnetic tape substantially on one spindle within a two-spindle cassette comprising receptacle-forming means defining a slot and a longitudinal receptacle for said cassette, guide means along one side of said receptacle for guiding said cassette during insertion and return of said cassette through said slot, the structure of said guide means and cooperation thereof with the structure of said cassette preventing insertion of said cassette in one orientation of said cassette and enabling insertion in another orientation of said cassette, a degaussing coil mounted proximate said receptacle and adjacent the slot end thereof such that in the orientation of said cassette enabled for insertion, one of the spindles of said cassette bearing said tape will pass said degaussing coil once upon insertion and once upon return of said cassette, and tape supporting means including a disc for cushioning said cassette during its insertion without causing unnecessary frictional engagement between said disc and said receptacle, said receptacle being of a size longitudinally which is approximately equal to the longitudinal size of a combination of said cassette and said disc, whereby said spindle which is coiled with said tape is the only spindle of the two passing fully into the field of said degaussing coil, said system further comprising a longitudinal guideway defined by said receptacle-forming means, operational switches located proximate the slot end of said guideway and operationally connected to said degaussing coil, and connecting means operatively attached to said disc and protruding through said guideway to move in a path confined by said guideway, said connecting means moving with said disc and for actuating said switches, which energize said degaussing coil.

* * * * *